(12) United States Patent
Zhao et al.

(10) Patent No.: US 12,135,999 B2
(45) Date of Patent: Nov. 5, 2024

(54) INFORMATION PROCESSING METHOD, SERVER, DEVICE-TO-DEVICE SYSTEM AND STORAGE MEDIUM FOR THE INTERNET OF THINGS

(71) Applicants: Beijing BOE Technology Development Co., Ltd., Beijing (CN); BOE TECHNOLOGY GROUP CO., LTD., Beijing (CN)

(72) Inventors: Junjie Zhao, Beijing (CN); Qian Zhang, Beijing (CN)

(73) Assignees: Beijing BOE Technology Development Co., Ltd., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 439 days.

(21) Appl. No.: 17/421,811

(22) PCT Filed: Jan. 7, 2020

(86) PCT No.: PCT/CN2020/070756
§ 371 (c)(1),
(2) Date: Jul. 9, 2021

(87) PCT Pub. No.: WO2020/147620
PCT Pub. Date: Jul. 23, 2020

(65) Prior Publication Data
US 2022/0100577 A1 Mar. 31, 2022

(30) Foreign Application Priority Data
Jan. 14, 2019 (CN) .......................... 201910033268.8

(51) Int. Cl.
*G06F 9/50* (2006.01)

(52) U.S. Cl.
CPC ............ *G06F 9/5077* (2013.01); *G06F 9/505* (2013.01); *G06F 9/5072* (2013.01)

(58) Field of Classification Search
None
See application file for complete search history.

(56) References Cited

U.S. PATENT DOCUMENTS 9,832,076 B2    11/2017  Ryu et al.
10,496,611 B1 * 12/2019  Singh ...................... G06F 16/11
(Continued)

FOREIGN PATENT DOCUMENTS

| CN | 103561014 A | 2/2014 |
| CN | 105487394 A | 4/2016 |

OTHER PUBLICATIONS

First Office Action for India Patent Application No. 202127035905 mailed Feb. 7, 2023.
(Continued)

*Primary Examiner* — Adam Lee
(74) *Attorney, Agent, or Firm* — Perilla Knox & Hildebrandt LLP; Kenneth A. Knox

(57) ABSTRACT

Provided is an information processing method. The method comprises: creating a container instance resource, wherein the container instance resource comprises content information and action information; parsing the content information to acquire an action instruction that can be identified by an execution apparatus; and adding the action instruction to the action information under the container instance resource, and sending the action instruction to the execution apparatus. Further provided are a server, a device-to-device system, and a non-transitory computer-readable storage medium. The method has a simple flow and high efficiency.

14 Claims, 5 Drawing Sheets

(56) References Cited

U.S. PATENT DOCUMENTS

| | | | |
|---|---|---|---|
| 2012/0307764 A1* | 12/2012 | Zhao | H04W 8/186 370/329 |
| 2016/0322044 A1* | 11/2016 | Jung | G10L 15/065 |
| 2018/0121629 A1* | 5/2018 | Dyer | G06Q 40/08 |
| 2018/0295197 A1 | 10/2018 | Vedula et al. | |

OTHER PUBLICATIONS

Hearing Notice for India (IN) Patent Application No. 202127035905 of Jun. 12, 2024.

* cited by examiner

INFORMATION PROCESSING METHOD, SERVER, DEVICE-TO-DEVICE SYSTEM AND STORAGE MEDIUM FOR THE INTERNET OF THINGS

CROSS-REFERENCE TO RELATED APPLICATIONS

The present application is a 35 U.S.C. § 371 national phase application of International Application No. PCT/CN2020/070756 filed on Jan. 7, 2020 which claims the benefit of and priority to Chinese Patent Application No. 201910033268.8, filed on Jan. 14, 2019, the contents of both of which are hereby incorporated by reference in their entirety herein.

TECHNICAL FIELD

The present disclosure relates to the field of Internet of Things and, in particular, to an information processing method, a server that executes the method, a device-to-device system (i.e., oneM2M) including the server, and a non-transitory computer-readable storage medium.

BACKGROUND

With the development of the Internet of Things technologies, oneM2M protocol has emerged. Specifically, the oneM2M protocol is composed of eight regional standards organizations dedicated to establishing common service layer standards. At present, standards for application fields such as home furnishings, vehicle to everything, and industrial interconnection have been determined. In the oneM2M protocol, an external service is provided based on a resource and an interface. The resource may represent a physical device (for example, a node resource represents a device), a logical device (for example, an AE resource represents an application module), and may also represent functions (for example, container represents a vessel). In the home furnishing field, a remote control between devices may be achieved through the oneM2M protocol.

However, in an existing device-to-device system, an interaction between an interactive device and a server is too cumbersome

SUMMARY

As an aspect of the present disclosure, there is provided an information processing method, and the method includes: creating a container instance resource, wherein the container instance resource includes content information and action information; parsing the content information to acquire an action instruction that is identifiable by an execution apparatus; adding the action instruction to the action information of the container instance resource; and sending the action instruction to the execution apparatus.

In an exemplary embodiment, the method further includes the following performed after the action instruction is added to the action information of the container instance resource, storing response information after the action instruction is executed by the execution apparatus.

In an exemplary embodiment, the method further includes the following performed before the container instance resource is created, receiving a request for creating the container instance resource.

In an exemplary embodiment, parsing the content information to acquire the action instruction that is identifiable by the execution apparatus includes: parsing the content information to acquire a parsing result; generating the action instruction corresponding to the parsing result; creating an action instruction resource corresponding to the action instruction; and generating a corresponding action address attribute and a corresponding result attribute for the action instruction resource.

In an exemplary embodiment, when parsing is performed on the content information to acquire multiple parsing results, and parsing the content information to acquire the action instruction that is identifiable by the execution apparatus includes generating an execution sequence attribute of each action instruction.

In an exemplary embodiment, parsing a received operation instruction to acquire the action instruction that is identifiable by the execution apparatus includes: parsing the received content information to acquire a parsing result; generating the action instruction corresponding to the parsing result; creating an action instruction resource corresponding to the action instruction and a result resource corresponding to the action instruction; and generating an action address attribute of the action instruction resource and a result address attribute of the result resource.

In an exemplary embodiment, when parsing is performed on the received operation instruction to acquire multiple parsing results, parsing the received content information to acquire the action instruction that is identifiable by the execution apparatus includes generating an execution sequence attribute for each action instruction.

In an exemplary embodiment, the method further includes the following performed before creating the container instance resource: registering the execution apparatus and an interactive device that sends the content information; and creating corresponding resources for the registered execution apparatus and the registered interactive device.

In an exemplary embodiment, the content information includes one or more of voice information, video information, and text information.

As a second aspect of the present disclosure, there is provided a server. The server includes a communication module, a common service entity, and an application entity, wherein the common service entity includes a control module and a storage module.

The control module is configured to create a container instance resource in the storage module, and the container instance resource includes content information and action information.

The application entity is configured to parse the content information to acquire a parsing result.

The control module is further configured to generate the action instruction that is identifiable by an execution apparatus according to the parsing result, and add the action instruction to the action information of the container instance resource. The control module is further configured to send the action instruction to the execution apparatus by the communication module.

In an exemplary embodiment, the control module is further configured to store, in the storage module, response information after the action instruction is executed by the execution apparatus.

In an exemplary embodiment, the communication module is further configured to receive a request for creating a content instance resource.

In an exemplary embodiment, the application entity includes a parsing module and an instruction creation and update module. The parsing module is configured to parse the content information to generate a parsing result. The instruction creation and update module is configured to generate an instruction creation and update request according to the parsing result.

The control module includes an action instruction generation unit, a resource creation unit, and an attribute generation unit. The action instruction generation unit is configured to generate an action instruction corresponding to the parsing result according to the instruction creation and update request. The resource creation unit is configured to create an action instruction resource corresponding to the action instruction. The attribute generation unit is configured to generate a corresponding action address attribute and a corresponding result attribute for the action instruction resource.

In an exemplary embodiment, the attribute generation unit is further configured to generate an execution sequence attribute for each action instruction in case that parsing is performed on the content information to acquire multiple parsing results.

In an exemplary embodiment, the application entity includes a parsing module and an instruction creation and update module. The parsing module is configured to parse the content information to generate a parsing result. The instruction creation and update module is configured to generate an instruction creation and update request according to the parsing result.

The control module includes an action instruction generation unit, a resource creation unit, and an attribute generation unit. The action instruction generation unit is configured to generate an action instruction corresponding to the parsing result according to the instruction creation and update request. The resource creation unit is configured to create an action instruction resource corresponding to the action instruction and a result resource corresponding to the action instruction. The attribute generation unit is configured to generate a corresponding action address attribute and a corresponding result attribute for the action instruction resource, and to generate a result address attribute of the result resource.

In an exemplary embodiment, the attribute generation unit is further configured to generate an execution sequence attribute for each action instruction in case that parsing is performed on the content information to acquire multiple parsing results.

In an exemplary embodiment, the common service entity further includes a registration module. The registration module is configured to register the execution apparatus and an interactive device that sends the content information, and to create corresponding resources for the registered execution apparatus and the registered interactive device.

In an exemplary embodiment, the content information includes one or more of voice information, video information, and text information.

As a third aspect of the present disclosure, there is provided a device-to-device system. The device-to-device system includes an interactive device, a server, and an execution apparatus, wherein the server is the above-mentioned server provided by the present disclosure.

The execution apparatus is configured to execute a corresponding operation after receiving the action instruction.

The interactive device is configured to send a result acquiring instruction to the communication module.

In an exemplary embodiment, the interactive device is further configured to receive response information sent by the server after the action instruction is executed by the execution apparatus.

In an exemplary embodiment, the interactive device is further configured to receive the content information, and to generate a request for creating the container instance resource according to the content information, and the interactive device is further configured to send the request for creating the container instance resource to the communication module.

In an exemplary embodiment, the interactive device is further configured to send a registration request to the server, and the execution apparatus is further configured to send a registration request to the server.

As a fourth aspect of the present disclosure, there is provided a computer-readable storage medium, and the computer-readable storage medium is configured to store an executable program, wherein the executable program can execute the above-mentioned information processing method provided by the present disclosure.

BRIEF DESCRIPTION OF THE DRAWINGS

The accompanying drawings are used for providing a further understanding of the present disclosure and constitute a part of the specification. These accompanying drawings are used for explaining the present disclosure together with the following specific embodiments, but do not constitute a limitation to the present disclosure. In the drawings.

DETAILED DESCRIPTION

Specific embodiments of the present disclosure will be described in detail below with reference to the accompanying drawings. It should be understood that the specific embodiments described herein are only used to illustrate and explain the present disclosure, rather than limiting the present disclosure.

Figure 1:
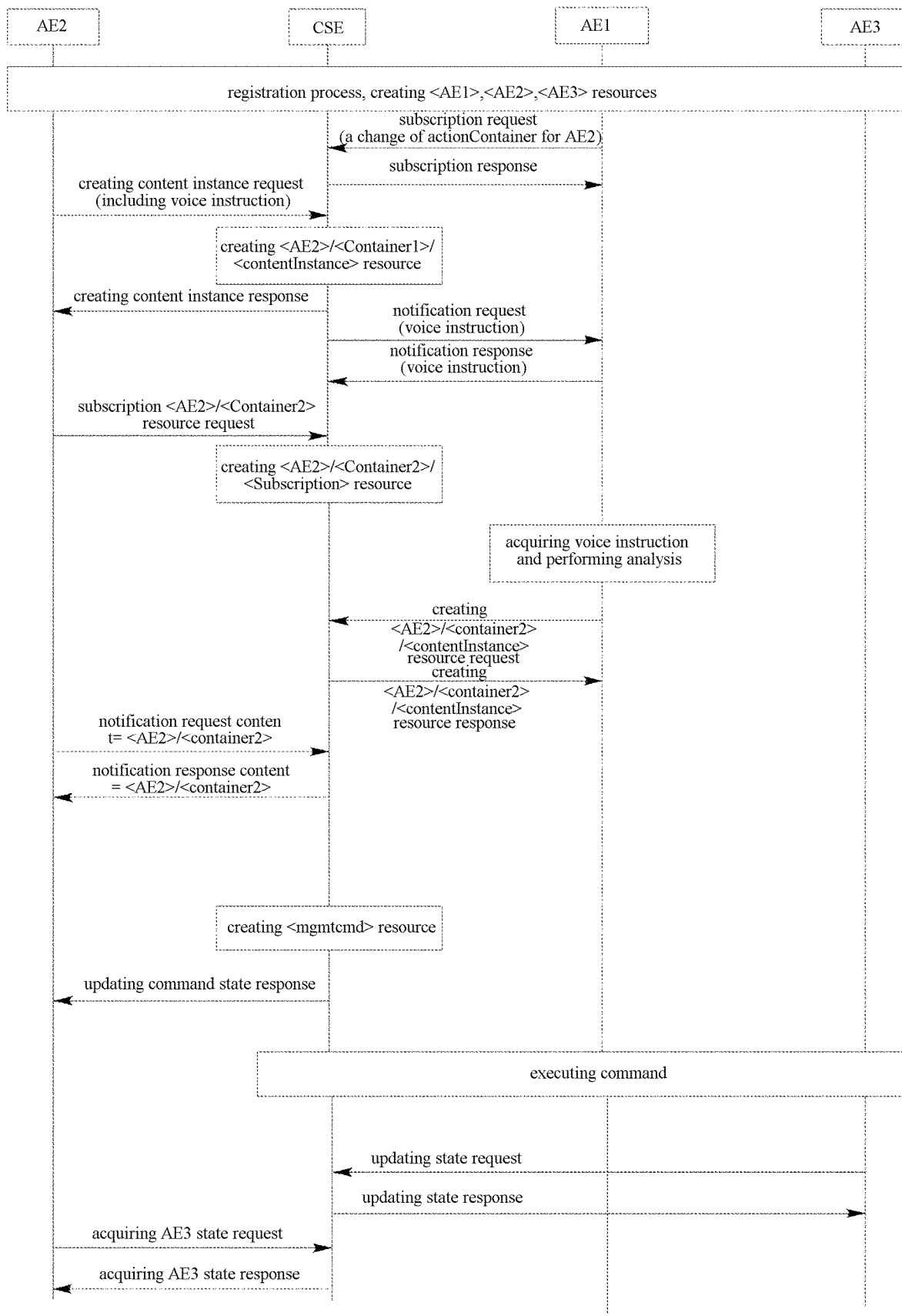
FIG. 1 is a schematic diagram of an information processing method in an existing device-to-device system.

FIG. 1 shows an information processing method of a device-to-device system in the related art. The device-to-device system includes a server, an interactive device AE2, and an execution apparatus AE3, wherein the server includes a common service entity CSE and an application entity AE1.

Specifically, a user sends an operation instruction (also referred to as content information) to the interactive device AE2, and the interactive device AE2 uploads the operation instruction to the server. Then, the server parses the operation instruction to acquire an action instruction that is executable by the execution apparatus AE3 (for example, smart home), and to send the action instructions to the execution apparatus.

As shown in FIG. 1, when the interactive device AE2 interacts with the server, it is first necessary to create a container <AE2>/<Container1>/<contentInstance> for the interactive device AE2 in the common service entity CSE of the server, where the container is used for storing a content instance resource. In addition, the interactive device also needs to subscribe to the content instance resource and create a corresponding subscription resource <AE2>/<Container2>/<Subscription>. After the application entity AE1 analyzes the received voice instruction, it needs to further create a command resource <mgmtcmd>. The interaction between the interactive device and the server is too cumbersome.

Figure 2:
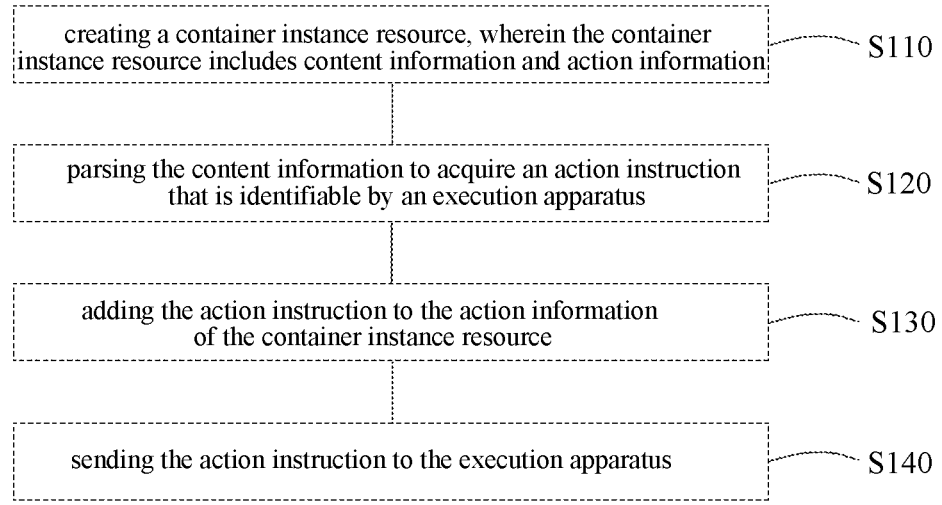
FIG. 2 is a flowchart of a method provided by the present disclosure.

The objective of the present disclosure is to provide an information processing method. As shown in FIG. 2, the method includes the following.

In S110, a container instance resource is created, and the container instance resource includes content information and action information.

In S120, the content information is parsed to acquire an action instruction that is identifiable by an execution apparatus.

In S130, the action instruction is added to the action information of the container instance resource.

In S140, the action instruction is sent to the execution apparatus.

Figure 7:
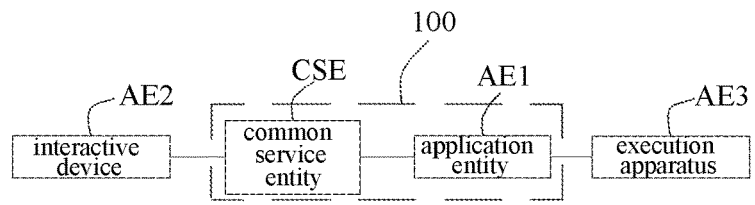
FIG. 7 is a schematic module diagram of a device-to-device system provided by the present disclosure.

The information processing method provided by the present disclosure is applied to the device-to-device system (i.e., oneM2M). As shown in FIG. 7, the device-to-device system includes a server 100, an interactive device AE2, and an execution apparatus AE3. The interactive device AE2 is a human-computer interaction interface. The interactive device AE2 receives content information (which may be one or more of voice information, text information, and video information) sent by the user, and sends the content information to the server 100 in an appropriate form. Then, the server 100 analyzes the content information and acquires an instruction that can be executed by the execution apparatus AE3. The execution apparatus AE3 here may be a smart home appliance (for example, a lamp, an air conditioner, a water heater, etc.) or other electronic device.

It should be understood that the "action information" in S110 is equivalent to an empty folder in some examples.

In the device-to-device system, the interactive device AE2 and the execution apparatus AE3 are both electronic devices. Moreover, in the present disclosure, the server 100 in the device-to-device system is an execution subject of the method.

The container instance resource created in S110 includes both the content information and the action information. Therefore, there is no need to construct a content container and an action container separately, which simplifies interaction between the interactive device and the server in the device-to-device system and improves efficiency of information processing.

According to an exemplary embodiment of the present disclosure, the information processing method may further include the following performed after S140: storing response information after the action instruction is executed by the execution apparatus.

It should be pointed out that in S110, the container instance resource is created according to a request for creating the container instance resource. Correspondingly, the method further includes the following performed before S110: receiving the request for creating the container instance resource.

In the device-to-device system, the request for creating the container instance resource is sent by the interactive device AE2. The request for creating the container instance resource includes the content information.

Figure 3:
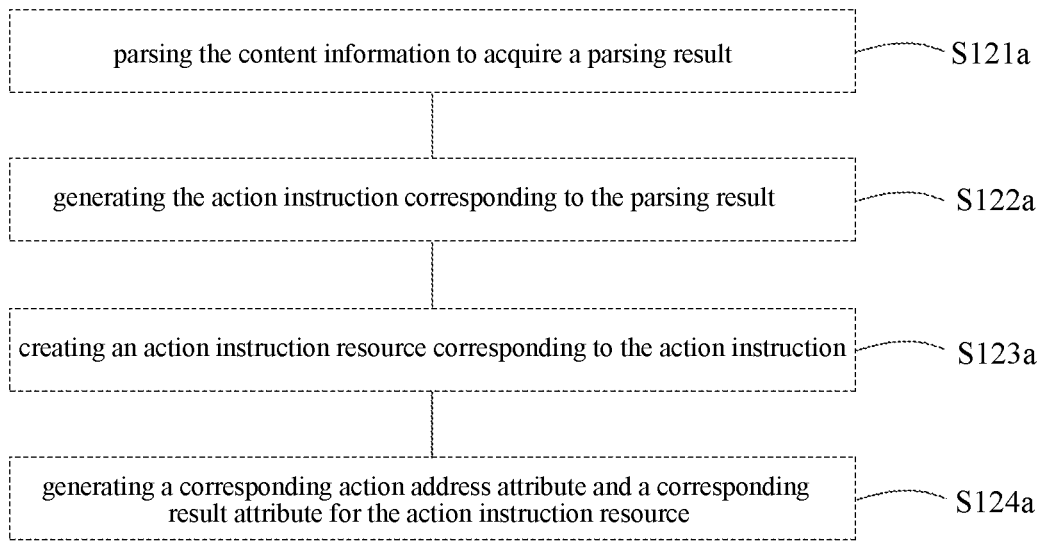
FIG. 3 is a flowchart according to an implementation of S120.

In the present disclosure, there is no special requirement on how to perform S120. According to an implementation, S120 may be implemented by constructing a container. Specifically, as shown in FIG. 3, S120 may include the following steps.

In S121a, the content information is parsed to acquire a parsing result.

In S122a, an action instruction corresponding to the parsing result is generated.

In S123a, an action instruction resource corresponding to the action instruction is created.

In S124a, a corresponding action address attribute and a corresponding result attribute are generated for the action instruction resource.

A result acquiring instruction issued by the interactive device AE2 may help to access the action address attribute and acquire the corresponding result attribute.

Figure 4:
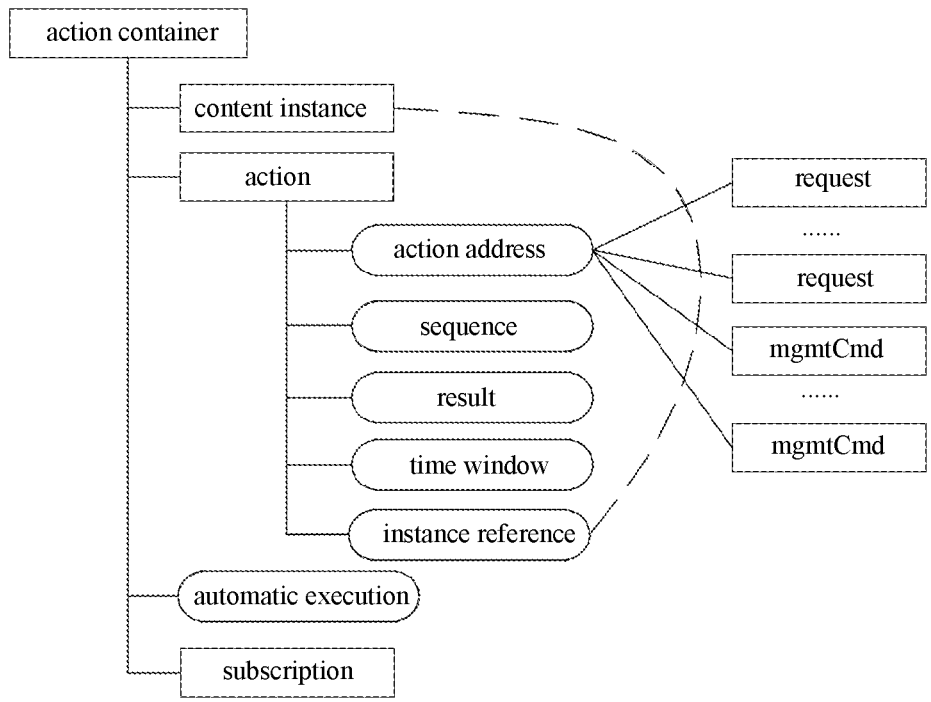
FIG. 4 is a resource structure diagram corresponding to the flowchart shown in FIG. 3.

FIG. 4 shows a schematic structural diagram of the action container resource constructed in the foregoing embodiments. A rectangular block represents a resource, and a rounded block represents an attribute. As shown in FIG. 2, the content instance (contentInstance) resource and the action (actions) resource are created in an action container (actionContainer). The action resource also includes an action address (actionID) attribute and a result (result) attribute.

Different action address attributes point to different action instruction resources (in the FIG. 4, request and mgmtCmd both represent action instruction resources). When different action instruction resources are pointed to, the action instructions in the action instruction resource may be called. After the execution apparatus AE3 receives the action instruction, the execution apparatus AE3 may be triggered to execute the corresponding action.

The action container resource shown in FIG. 4 includes a result attribute of each action instruction, and the interactive device AE2 may acquire an execution result of the action instruction corresponding to the action address attribute by accessing the corresponding action address attribute.

In an embodiment, the interactive device AE2 may acquire the execution result of each piece of content information by the execution apparatus AE3 through the action address attribute.

In S124a, the result attribute after the execution apparatus AE3 has executed the action instruction is stored (which is equivalent to storing state information after the execution apparatus AE3 has executed the action instruction). For example, when the execution apparatus AE3 is a light, and the action instruction is an instruction to "turn on the light" which may be executed by the light, the response information after the light executes the instruction to "turn on the light" is "lighting". That is, after receiving the instruction to "turn on the light", the light lights up. After sending the instruction to "turn on the light" to the execution apparatus AE3, the server 100 also stores, in the server 100, the corresponding information "lighting" after the execution apparatus AE3 executes the action instruction at the same time.

After receiving the result acquiring instruction sent by the interactive device AE2, the server 100 sends the response information after the execution apparatus AE3 executes the action instruction to the interactive device AE2. The interactive device AE2 does not need to subscribe to the server 100 for a state of the execution apparatus AE3, thus reducing steps of the information processing method.

In the implementation shown in FIG. 4, the action resource further includes a time window (timeWindow) attribute that defines a validity period of the action resource. In an exemplary embodiment, the action container may further include an automatic execution (autoExec) attribute. Of course, the action container also includes a subscription (subscription) resource.

In the present disclosure, there are no special requirements on the action instructions that may be parsed out of the content information sent by the interactive device AE2, and each piece of content information may correspond to only one action instruction or multiple action instructions.

For example, the content information is a voice of "turn on the light", and by parsing the voice content information, an action instruction corresponding to "turn on the light" may be acquired. As another example, the content information is a voice of "turn on the light and turn on the air conditioner". By parsing the voice content information, the action instruction corresponding to "turn on the light" and the action instruction corresponding to "turn on the air conditioner" may be acquired.

When parsing is performed on the received content information to acquire multiple action instructions, S124a also includes generating an execution sequence attribute for each action instruction. In the present disclosure, there is no special requirement on the execution sequence of the action instructions, as long as each action instruction is ensured to be executed in sequence.

Figure 5:
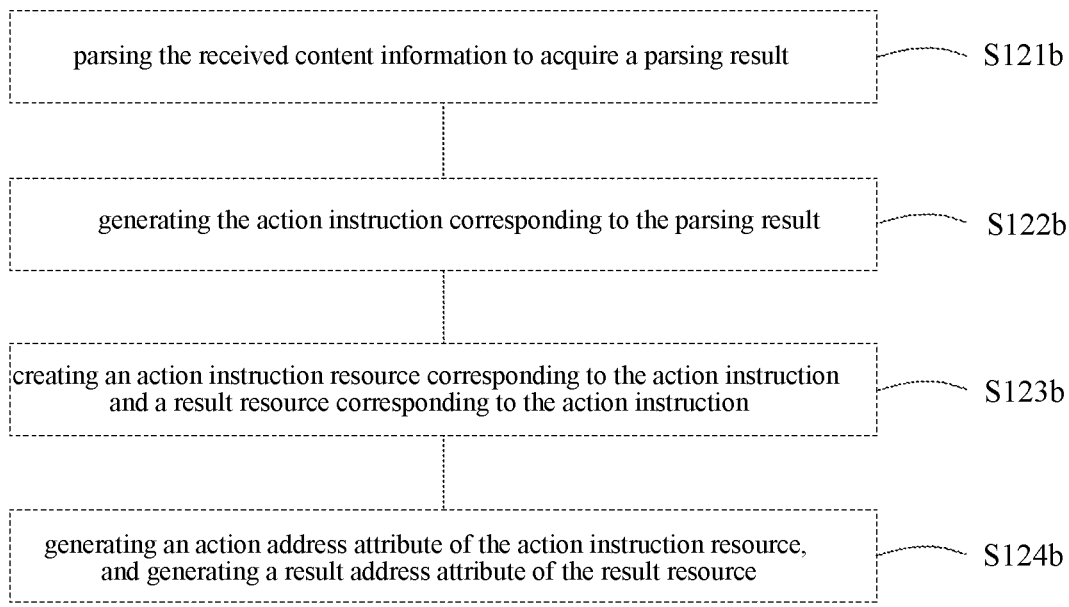
FIG. 5 is a flowchart according to another implementation of S120.

Of course, the present disclosure is not limited in this regard. According to another exemplary embodiment of the present disclosure, as shown in FIG. 5, S120 includes the following.

In S121b, the received content information is parsed to acquire a parsing result.

In S122b, an action instruction corresponding to the parsing result is generated.

In S123b, an action instruction resource corresponding to the action instruction and a result resource corresponding to the action instruction are created.

In S124b, an action address attribute of the action instruction resource is generated, and a result address attribute of the result resource is generated.

It should be pointed out that the status information after the execution apparatus executes each action instruction includes the result attribute, and the result acquiring instruction can access the result address attribute. By accessing the result address attribute, the result acquiring instruction can access the result attribute corresponding to the result address attribute, thereby sending the result attribute to the interactive device.

Figure 6:
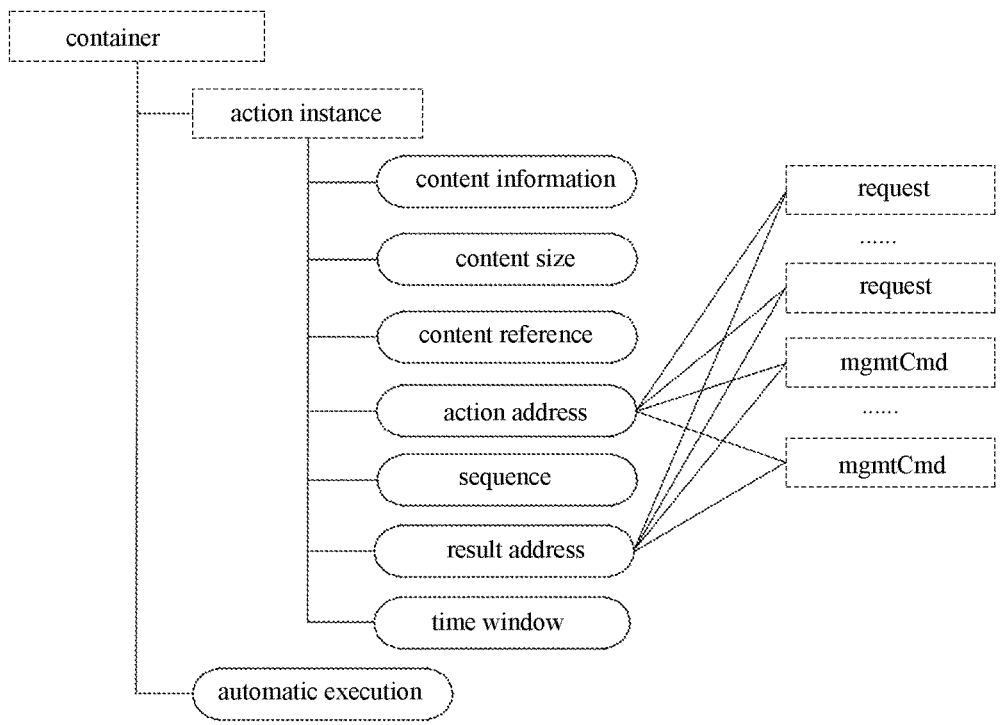
FIG. 6 is a resource structure diagram corresponding to the flowchart shown in FIG. 5.

FIG. 6 shows a resource structure diagram according to an embodiment. As shown in FIG. 6, the container includes an action content instance (actionContentInstance) resource, and the action content instance resource includes an action address (actionID) attribute and a result address (resultID) attribute. According to an implementation, only the content of the content instance resource is expanded, so that the content instance resource includes more action-related content, and modification is made to a lower level of the content, thereby achieving better atomicity.

According to an exemplary embodiment, the action content instance resource of the container resource shown in FIG. 6 may also include a content information (contentInfo) attribute, a content size (contentSize) attribute, a content reference (contentRef) attribute, a content (content) attribute, and a time window (timeWindow) attribute. The container resource may also include an automatic execution (autoExec) attribute.

When multiple action instructions may be parsed out of the content information, S124b further includes generating a sequence attribute that characterizes the execution sequence of the multiple action instructions.

Compared with the related art, in the resource structure shown in FIG. 6, the container is not redefined, but the content of the content instance resource is expanded. Thus, the content instance resource includes action-related content, and modification is made to a lower level of the content, thereby achieving better atomicity.

As described above, the method provided by the present disclosure is applied to the device-to-device (oneM2M) system, and the server 100 includes a common service entity CSE and an application entity AE1. For the device-to-device system, each electronic device (including the interactive device AE2 and the execution apparatus AE3) is implemented through interaction with the common service entity CSE. Specifically, the application entity is connected to the common service entity through the interface, and then the interaction with the electronic devices is performed through the communication between the common service entities.

In order to realize the communication of the interactive device AE2 and the execution apparatus AE3 with the common service entity, the interactive device AE2 and the execution apparatus AE3 need to be registered on the common service entity. Accordingly, the method further includes the following performed before S110: registering the execution apparatus AE3 and the interactive device AE2 that sends the content information; and creating corresponding resources for the registered execution apparatus AE3 and the registered interactive device AE2.

In the present disclosure, no special requirements are imposed on a specific type of content information. For example, the content information may be text input by the user, voice uttered by the user, or video. In other words, the content information may include one or more of voice information, text information, and video information. According to an exemplary embodiment, the content information is the voice uttered by the user.

As mentioned above, a piece of content information may correspond to multiple action instructions, or may also correspond to a single action instruction.

In an embodiment, the interactive device AE2 may include a smart soundbox. The interactive device may receive the voice information from the user, and send the voice information to the server 100 as the content information.

As a second aspect of the present disclosure, there is provided a server, and the server provided in the present disclosure is the server 100 configured to execute the method described above. As shown in FIG. 7, the server includes a communication module (not shown), a common service entity CSE, and an application entity AE1.

Figure 8:
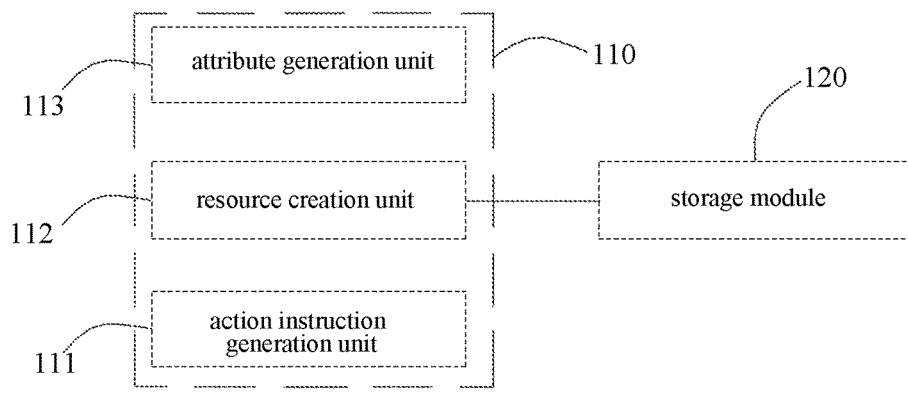
FIG. 8 is a schematic diagram according to an implementation of a common service entity.

As shown in FIG. 8, the common service entity CSE includes a control module 110 and a storage module 120.

The control module 110 is configured to create a container instance resource in the storage module 120, and the container instance resource includes content information and action information.

The application entity AE1 is configured to parse the content information to acquire a parsing result.

The control module 110 is further configured to generate an action instruction that is identifiable by an execution apparatus according to the parsing result, and add the action instruction to the action information of the container instance resource.

The control module 110 is further configured to send the action instruction to the execution apparatus AE3 through the communication module.

The control module 110 is configured to perform S110, S130, and S140, and the control module 110 and the application entity AE1 jointly perform S120. The information processing method has been described in detail above, and will not be repeated here.

In an exemplary embodiment, the control module 110 is further configured to store, in the storage module 120, response information after the action instruction is executed by the execution apparatus AE3.

In an exemplary embodiment, the communication module is further configured to receive a request for creating the content instance resource, and the control module 110 is configured to create the content instance resource according to the content information in the request for creating the content instance resource.

In the present disclosure, a specific structure of the application entity AE1 is not specifically limited. For example, the application entity AE1 may include a parsing module 210 and an instruction creation and update module 220. The parsing module 210 is configured to parse the content information to generate a parsing result. The instruction creation and update module 220 is configured to generate an instruction creation and update request according to the parsing result.

Correspondingly, the control module 110 may include an action instruction generation unit 111, a resource creation unit 112, and an attribute generation unit 113. The action instruction generation unit 111 is configured to generate an action instruction corresponding to the parsing result according to the instruction creation and update request. The resource creation unit is configured to create an action instruction resource corresponding to the action instruction. The attribute generation unit 113 is configured to generate a corresponding action address attribute and a corresponding result attribute for the action instruction resource.

It should be pointed out that both the action address attribute and the result attribute are added to the action information.

As mentioned above, one piece of content information can correspond to multiple action instructions. When the parsing module 210 parses the content information to acquire multiple action instructions, the attribute generation unit 113 may also generate an execution sequence attribute for each action instruction.

It should be pointed out that the execution sequence attribute is also added to the action information.

The container shown in FIG. 3 may be constructed by the control module having the above-mentioned structure.

As another exemplary embodiment of the present disclosure, the application entity AE1 may include a parsing module 210 and an instruction creation and update module 220. The parsing module 210 is configured to parse the content information to generate a parsing result. The instruction creation and update module 220 is configured to generate an instruction creation and update request according to the parsing result.

Correspondingly, the control module 110 may include an action instruction generation unit 111, a resource creation unit 112, and an attribute generation unit 113. The action instruction generation unit 111 is configured to generate an action instruction corresponding to the parsing result according to the instruction creation and update request. The resource creation unit 112 is configured to create an action instruction resource corresponding to the action instruction and a result resource corresponding to the action instruction. The attribute generation unit 113 is configured to generate a corresponding action address attribute and a corresponding result attribute for the action instruction resource, and to generate a result address attribute of the result resource.

The container shown in FIG. 5 may be constructed by using the control module 110 in the above embodiment.

As described above, when the parsing module can acquire multiple parsing results by parsing a piece of content information, the attribute generation unit 113 is further configured to generate the execution sequence attribute for each action instruction.

As mentioned above, both the execution apparatus AE3 and the interactive device AE2 need to be registered on the common service entity CSE. Correspondingly, the common service entity CSE also includes a registration module 130, which is configured to register the execution apparatus AE3 and the interactive device AE2, and to create corresponding resources for the registered execution apparatus AE3 and the registered interactive device AE2.

As described above, the content information may include one or more of voice information, video information, and text information. When the content information includes the voice information, the interactive device AE2 is a smart speaker. When the content information is the video information, the interactive device AE2 may be a smart camera.

As a third aspect of the present disclosure, there is provided a device-to-device system. The device-to-device system includes an interactive device AE2, a server, and an execution apparatus AE3. The server is the above-mentioned server 100 provided by the present disclosure.

The execution apparatus AE3 is configured to execute a corresponding operation after receiving the action instruction, and the interactive device AE2 is configured to send a result acquiring instruction to the communication module.

In an exemplary embodiment, the interactive device AE2 is further configured to receive response information sent by the server after the execution apparatus AE3 executes the action instruction.

In an exemplary embodiment, the interactive device is further configured to receive the content information, and to generate a request for creating the container instance resource according to the content information, and the interactive device is further configured to send the request for creating the container instance resource to the communication module.

Figure 9:
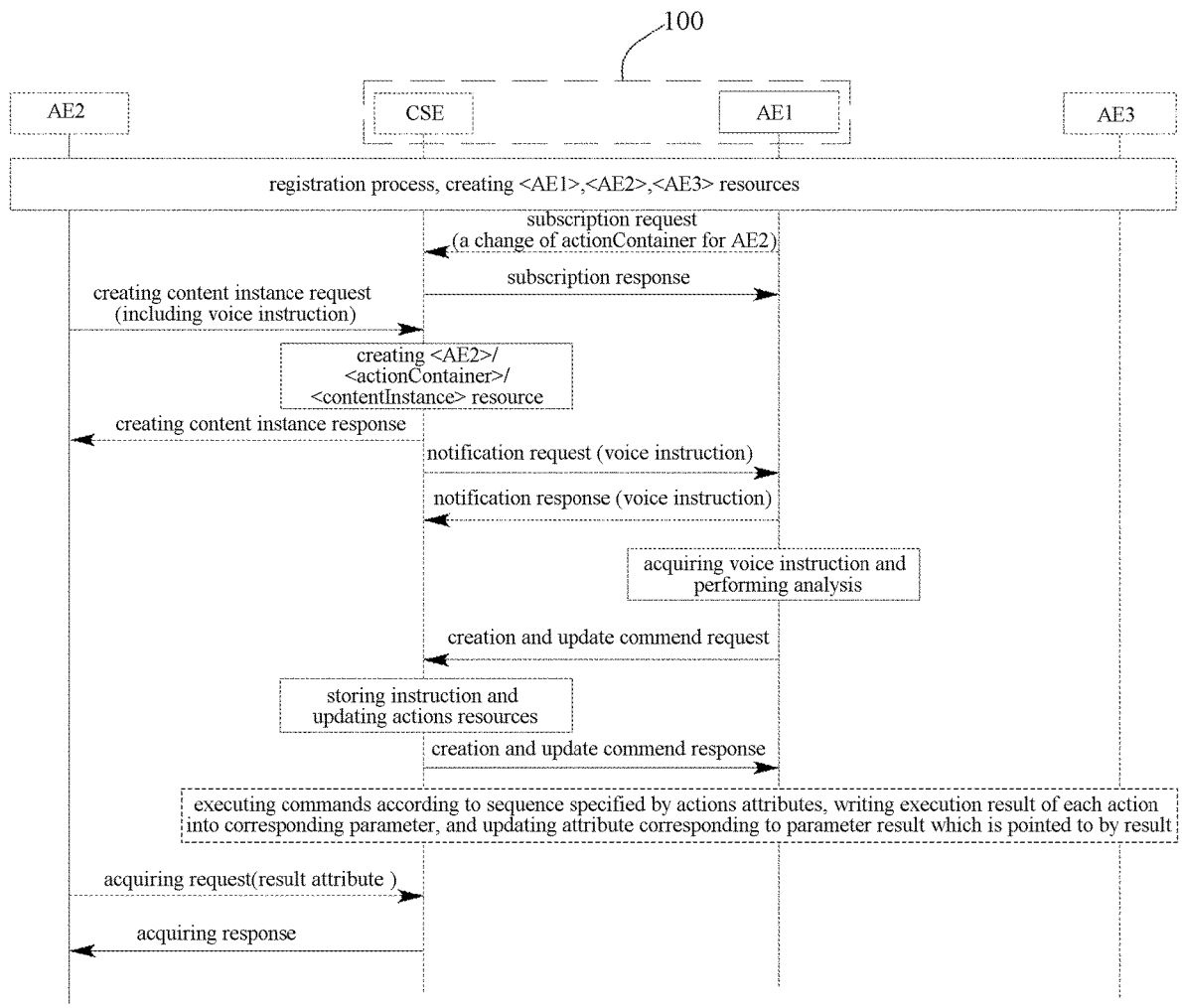
FIG. 9 includes a flowchart of a method executed by a device-to-device system of the common service entity shown in FIG. 8.

The following describes, with reference to FIG. 9, a specific process of a method, including the processes shown in FIG. 3, executed by a server including the common service entity CSE shown in FIG. 8.

First, the application entity AE1, the interactive device AE2, and the execution apparatus AE3 are registered on the common service entity CSE, which creates a resource <AE1> corresponding to the application entity AE1, a resource <AE2> corresponding to the interactive device AE2, and a resource <AE3> corresponding to the execution apparatus AE3.

The application entity AE1 subscribes to the common service entity CSE the change of the action container (actionContainer) corresponding to the interactive device AE2.

The common service entity CSE sends a subscription response to the application entity AE1.

The interactive device AE2 sends a request for creating the content instance to the common service entity (the request for creating the content instance includes a voice instruction).

In accordance with S111a to S117a shown in FIG. 3, the common service entity CSE creates a <AE2>/<actionContainer>/<contentInstance> resource corresponding to the interactive device AE2 according to the received voice instruction.

The common service entity CSE sends a content instance creation response to the interactive device AE2.

The common service entity CSE sends a notification request (including the voice instruction) to the application entity AE1, and the application entity AE1 parses the voice instruction after receiving the notification request.

The application entity AE1 sends the parsing result to the common service entity CSE, and sends the creation and update command request to the common service entity CSE.

The public service entity CSE stores the action instruction and updates the action resource.

The common service entity CSE sends the creation and update command response to the application entity AE1.

The action instruction is sent to the execution apparatus AE3, and the execution apparatus AE3 executes the action instructions in a specified order. At the same time, the common service entity CSE writes an execution result of each action instruction into the corresponding parameter, and updates an attribute corresponding to a parameter result which is pointed to by the result attribute.

The interactive device AE2 sends a result acquiring request to the common service entity CSE to access the result attribute.

The common service entity CSE sends the execution result information of the execution apparatus in the corresponding result attribute to the interactive device AE2.

As a fourth aspect of the present disclosure, there is provided a non-transitory computer-readable storage medium configured to store an executable program, where the executable program, when executed by at least one hardware processor, can execute the above-mentioned method provided by the present disclosure.

It may be understood that the above implementations are merely exemplary implementations used to illustrate the principle of the present disclosure, but the present disclosure is not limited thereto. For those of ordinary skilled in the art, various modifications and improvements may be made without departing from the spirit and essence of the present disclosure, and these modifications and improvements are also deemed to be within the protection scope of the present disclosure.

What is claimed is:

1. An information processing method, performed by a server, and comprising:
   receiving content information,
   wherein:
      a container instance resource comprises the content information and action information,
      textual action information is based on the content information,
      a plurality of action instructions and an execution sequence attribute of each action instruction are based on the textual action information,
      a respective action instruction resource corresponds to each action instruction,
      an action address attribute and a result attribute for each action instruction resource correspond to each action instruction,
      the action information of the container instance resource comprises the plurality of action instructions and the respective execution sequence attributes; and
   sending the plurality of action instructions and the respective execution sequence attributes to an execution apparatus, wherein:
      the content information comprises one or more of voice information, video information, or text information,
      the execution apparatus executes operations according to the plurality of action instructions and the respective execution sequence attributes,
      a respective action instruction is based on the respective action address attribute, and
      a respective execution result is based on a respective result attribute and corresponds to the respective action instruction.

2. The method according to claim 1, further comprising, storing response information after the operations are executed by the execution apparatus.

3. The method according to claim 1, further comprising, receiving a request for creating the container instance resource.

4. The method according to claim 3, wherein:
   the execution apparatus corresponds to an interactive device that sends the content information, and
   the registered execution apparatus and the registered interactive device each comprise corresponding resources.

5. The method according to claim 1, wherein:
   a respective result resource corresponds to each action instruction, and
   a result address attribute corresponds to the result resource.

6. A server, comprising:
   a processor, a communication module, a common service entity, and an application entity, wherein the common service entity comprises a control module and a storage module, wherein:
      the communication module is configured to receive content information;
      the storage module stores a container instance resource, and the container instance resource comprises the content information and action information;
      the application entity comprises a parsing module and an instruction creation and update module, wherein textual action information is based on the content information, and an instruction creation and update request is based on the textual action information;
      the control module comprises an action instruction generation unit and a resource creation unit, wherein a plurality of action instructions and an execution sequence attribute of each action instruction correspond to the textual action information according to the instruction creation and update request, and an action instruction resource corresponds to each action instruction;
      the control module further comprises an attribute generation unit, wherein an action address attribute and a result attribute for each action instruction resource correspond to each action instruction;
      the action information of the container instance resource further comprises the plurality of action instructions and the respective execution sequence attributes; and
      the control module is further configured to send the plurality of action instructions and the respective execution sequence attributes to an execution apparatus by the communication module, wherein:

the content information comprises one or more of voice information, video information, or text information;

the execution apparatus executes operations according to the plurality of the action instructions and the respective execution sequence attributes;

a respective action instruction is based on the respective action address attribute; and a respective execution result is based on a respective result attribute and corresponds to the respective action instruction.

7. The server according to claim 6, wherein the control module is further configured to store, in the storage module, response information after the operations are executed by the execution apparatus.

8. The server according to claim 6, wherein the communication module is further configured to receive a request for creating a content instance resource.

9. The server according to claim 8, wherein the common service entity further comprises a registration module, the execution apparatus corresponds to an interactive device that sends the content information, and the registered execution apparatus and the registered interactive device each comprise corresponding resources.

10. The server according to claim 6, wherein:

a respective result resource corresponds to each action instruction; and each respective result resource comprises a result address attribute.

11. A device-to-device system, comprising:

an interactive device, a server having a processor, and an execution apparatus, wherein:

the execution apparatus is configured to execute a corresponding operation after receiving the action instruction;

the interactive device is configured to send a result acquiring instruction to the communication module;

the server comprises a communication module, a common service entity, and an application entity, where the common service entity comprises a control module and a storage module;

the communication module is configured to receive content information from the interactive device;

the storage module stores a container instance resource, and the container instance resource comprises the content information and action information;

the application entity comprises a parsing module and an instruction creation and update module, textual action information is based on the content information, and an instruction creation and update request are based on the textual action information;

the control module comprises an action instruction generation unit and a resource creation unit, a plurality of action instructions and an execution sequence attribute of each action instruction corresponding to the textual action information are based on the instruction creation and update request, and a respective action instruction resource corresponds to each action instruction;

the control module further comprises an attribute generation unit, and an action address attribute and a result attribute for each action instruction resource correspond to each action instruction;

the action information of the container instance resource further comprises the plurality of action instructions and the respective execution sequence attributes; and the control module is further configured to send the plurality of action instructions and the respective execution sequence attributes to the execution apparatus by the communication module, wherein:

the content information comprises one or more of voice information, video information, or text information;

the execution apparatus executes operations according to the plurality of the action instructions and the respective execution sequence attributes;

a respective action instruction is based on the respective action address attribute; and a respective execution result is based on a respective result attribute and corresponds to the respective action instruction.

12. The device-to-device system according to claim 11, wherein the interactive device is further configured to receive response information sent by the server after the operations are executed by the execution apparatus.

13. The device-to-device system according to claim 12, wherein the interactive device is further configured to send a registration request to the server, and the execution apparatus is further configured to send a registration request to the server.

14. The device-to-device system according to claim 11, wherein:

the interactive device is further configured to receive the content information, and a request for creating the container instance resource is based on the content information, and the interactive device is further configured to send the request for creating the container instance resource to the communication module.

* * * * *